July 26, 1927.

F. FRASER 1,637,021

METHOD OF MAKING MULTIFOCAL LENSES

Filed Aug. 7, 1924

INVENTOR
Frank Fraser
BY
Harry H. Styll
ATTORNEY

Patented July 26, 1927.

1,637,021

UNITED STATES PATENT OFFICE.

FRANK FRASER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

METHOD OF MAKING MULTIFOCAL LENSES.

Application filed August 7, 1924. Serial No. 730,614.

The present invention relates to an improved process of producing multifocal lens of the two part type. It is a well known fact that in a finished lens of this type the oblique vision through the reading portion is variable, increasing in power from the center towards the margin, which increase is quite a pronounced and objectionable aberration.

An important object of the invention is to provide an improved multifocal formed of two pieces of glass of different indices of refraction, which will be practically free from the objectionable variations present in the reading portion of the prior art lenses of this type.

Another very important object of the invention is to provide a new and improved process for forming two part lenses whereby the objectionable oblique errors will be eliminated so as to produce a reasonably correct vision or visions through the reading portion of the lens.

A still further object of the invention is to provide a two part multifocal lens and process for producing the same whereby the distance portion of the lens will be formed from a glass having a low index of refraction and a low fusing temperature while the reading portion will be formed from a glass having a high index of refraction and a relatively high fusing temperature.

A still further object of the invention is to provide a two part multifocal lens and process for producing the same whereby the desired surface of curvature is formed on the reading portion after which the major or distance portion is fused to the reading portion without changing the said surface of curvature of the reading portion.

Other objects and advantages of the invention will become apparent during the course of the following description.

In the drawings wherein like numerals are employed to designate like parts throughout the same, Figure 1 is a plan view of the finished lens.

Figure 1:
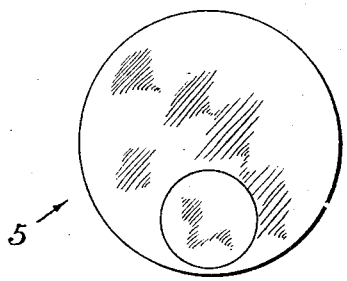

In the drawings wherein for the purposes of illustration is shown the preferred embodiment of the invention the numeral 5 designates a lens in its entirety.

Figure 2:
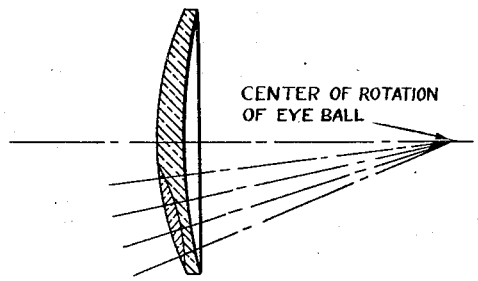
Figure 2 is a diagrammatic view of a lens in section.
Figure 3:
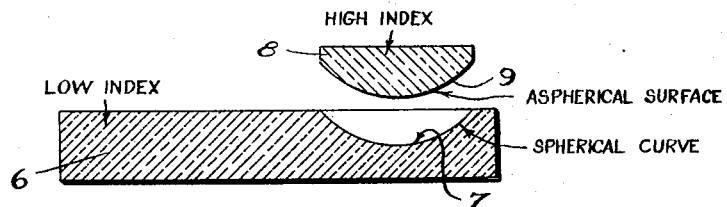
Figure 3 is a sectional view illustrating the major and minor portions of the lens before the fusing operation.

It will be noted from the diagrammatic view, Figure 2, that the reading portion or segment of a bifocal lens being placed at the bottom of the lens below the center of the eye and below the optical axis of the distance portion, practically all of the rays of light from the center of the eye will pass obliquely through the reading portion. In other words, a bifocal lens located in its position of greatest use before the eyes, is practically always looked through in an oblique direction and it is well known that oblique vision is not as clear as vision along the optical axis or vision that goes normally through the lens. For this reason, among others, it has been found that there is a considerable variation in the power of the segment or reading portion of a fused bifocal at the center from that of the marginal portions. Variations amounting to as much as a half diopter have been noted in some of the ordinary numbers of these lenses.

One of the purposes of this invention is to neutralize this variation of power in the various portions of the reading portion of the bifocal. It will be obvious that as shown, the greater error will probably fall in the vertical plane when the lens is in position before the eye but there may be variations in the horizontal or other planes and it is a part of the conception of this invention that these variations in the horizontal, vertical or other planes may be overcome by providing the necessary means for neutralizing the error at any given angle or angles.

Heretofore, attempts have been made to overcome the oblique errors in the reading fields of fused bifocals but none of them have proven commercially practical or successful. All of the prior art structures have disclosed methods wherein the button has assumed the shape and curvature of the surface of the countersink in which it has been fused. This is due to the fact that the segment has been fused to the major blank.

In the present invention the curvature of the surface of the countersink assumes the curvature of the segment used. This is accomplished by fusing the major blank to the segment.

The lens 5 comprises a major blank or distance portion 6 having a countersink 7 therein. The segment or reading portion is designated by the numeral 8. In manufacturing the lens a major blank 6 is constructed from a glass having a low index of refraction and a low fusing temperature. A countersink 7 is formed in the major blank and has preferably a spherical surface of curvature. A spherical countersink can easily be ground and polished in the major blank, while on the other hand it is extremely difficult and almost impossible to form any other surface of curvature therein with any degree of accuracy.

Figure 4:
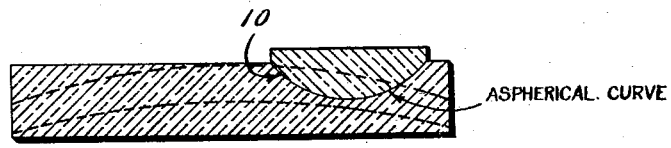
Figure 4 is a sectional view after the fusing operation.

After the countersink has been formed a segment or reading portion 8 is made from a glass having a relatively high index of refraction and high fusing temperature. An aspherical surface 9 is formed on the segment of any desired power or powers. After the surfaces 7 and 9 have been formed the segment is placed within the countersink and sufficient heat is applied to the parts to cause the major blank or distance portion to fuse to the reading portion and in so doing the curvature 7 will adapt itself to the curvature 9 on the segment. The curvature 10 in Figure 4 is identical with the surface 9 so that it is possible to overcome or neutralize the ordinary oblique errors in fused bifocals by forming the surface 9 of the desired curvatures.

The chief distinction of the present invention from the prior art is the fact that the curvature 10 is the curvature formed on the segment or in other words the surface of the countersink adapts itself to the curvature of the segment. This is important from a manufacturing standpoint as the segment can have any desired curvature formed thereon with comparative ease, while on the other hand it is almost impossible to form the desired aspherical curve in the countersink.

From the foregoing it will be seen that a fused multifocal lens is produced by fusing a major blank to a segment in such a manner that the major blank gets its curve from the segment thus giving a lens which will almost entirely obviate the objectionable aberrations of the prior art lenses.

It is to be understood that the form of the invention herewith shown and described is to be taken as the preferred embodiment of the same and that various changes in the shape, size and arrangement of parts can be resorted to without departing from the spirit of the invention or the scope of the subjoined claims.

Having thus described my invention, I claim:

1. The process of making a multifocal lens comprising making a cavity having a curved contour in a piece of glass having a relatively low fusing temperature, making a segment having a curvature on one side that is different in its two major meridians and having a relatively high fusing temperature, placing the segment in the cavity with the curved surfaces opposite each other, and applying heat to fuse the surface of the curved cavity to conform and adhere to the unfused segment.

2. The process of making a multifocal lens comprising making a cavity having a spherical contour in a piece of glass having a relatively low fusing temperature, making a segment having a curvature on one side that is different in its two major meridians and having a relatively high fusing temperature, placing the segment in the cavity with the curved surfaces opposite each other, and applying heat to fuse the surface of the spherical cavity to conform and adhere to the unfused segment.

3. The process of making a multifocal lens comprising making a cavity having a spherical contour in a piece of glass having a relatively low fusing temperature, making a segment having an aspherical curvature on one side and having a relatively high fusing temperature, placing the segment in the cavity with the curved surfaces opposite each other, and applying heat to fuse the surface of the spherical cavity to conform and adhere to the aspherical surface of the unfused segment.

FRANK FRASER.